United States Patent Office 3,483,222
Patented Dec. 9, 1969

3,483,222
PROCESS FOR THE SIMULTANEOUS MANUFACTURE OF ALIPHATIC HYDROXYCARBOXYLIC ACID LACTONES AND OF ALIPHATIC OR AROMATIC CARBOXYLIC ACIDS
Kurt Sennewald, Knapsack, near Cologne, and Heinrich Rehberg, Hermulheim, near Cologne, Germany, assignors to Knapsack Aktiengesellschaft, Knapsack, near Cologne, Germany, a corporation of Germany
No Drawing. Filed Nov. 18, 1965, Ser. No. 508,576
Claims priority, application Germany, Dec. 16, 1964, K 54,799
Int. Cl. C07d 9/00, 7/06, 5/06
U.S. Cl. 260—343
15 Claims

ABSTRACT OF THE DISCLOSURE

Preparation of lactones by reacting ketones with mineral or organic peracids; oxidation of cycloaliphatic ketones with oxygen in the presence of an aldehyde and a heavy metal salt accelerator; preparation of aliphatic hydroxy carboxylic acid lactones and aliphatic or aromatic carboxylic acids simultaneously by reacting cycloaliphatic ketones and aliphatic or aromatic aldehydes with oxygen in the presence of an iron compound.

---

The present invention relates to a process for the simultaneous manufacture of aliphatic hydroxycarboxylic acid lactones and of aliphatic or aromatic carboxylic acids by catalytic oxidation of a mixture comprising a cycloaliphatic ketone and an aliphatic or aromatic aldehyde with oxygen or an oxygen-containing gas.

It is known that the "Baeyer-Villiger" reaction permits reacting a ketone with a peracid to give the corresponding lactone. Both mineral and organic peracids have been employed as the oxidizing agents in carrying out this reaction. But good yields could only be obtained when successful attempts had been made to carry out the reaction with percarboxylic acids free from water and mineral acids, e.g. by a process such as disclosed in German specification No. 1,086,686. Percarboxylic acids free from water and mineral acid permitted preventing the lactone obtained from undergoing hydrolysis or polymerization. The above process, when applied to the manufacture e.g. of ε-hydroxycaproic acid lactone, comprises reacting cyclohexanone with anhydrous peracetic acid or acetaldehyde monoperacetate at a temperature of 0 to 100° C. in the presence of an inert organic solvent.

However, preparation and manipulation of anhydrous percarboxylic acids are not harmless and attempts have therefore subsequently been made with the aim of obviating the use of peracids and of oxidizing cycloaliphatic ketones with oxygen or an oxygen-containing gas in the presence of an aldehyde, the starting mixture being admixed with a minor proportion of a heavy metal salt which served as an agent accelerating the reaction. A process of this type has been disclosed in U.S. specification No. 3,025,306, which suggests using as the catalyst cobalt, manganese, platinum, palladium, vanadium, ruthenium, zirconium, aluminum, antimony, beryllium or copper salts in a proportion of 10 to 500 parts by weight per 1 million parts by weight of starting mixture. This conventional working method permits obtaining e.g. ε-hydroxycaproic acid lactone in a yield averaging 75%, related to the amount of cyclohexanone transformed.

The process of the present invention, which is generally applicable to the manufacture of ω-lactones and carried out under especially advantageous selected processing conditions with the use of a catalyst of improved efficiency, now permits increasing the lactone yields to more than 90%, related to the quantity of ketone transformed, and obtaining concurrently therewith as a further process product the carboxylic acid which corresponds to the aldehyde used.

The process of the present invention for the simultaneous manufacture of aliphatic hydroxycarboxylic acid lactones of the general formula:

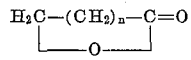

in which $n$ stands for a number of 2 to 30, preferably 2 to 10, and of aliphatic or aromatic carboxylic acids of the general formula:

R—COOH in which R means hydrogen or an alkyl group having 1 to 30 carbon atoms or means an optionally alkyl-substituted phenyl group, comprises reacting a mixture consisting of (A) a cycloaliphatic ketone of the general formula

in which $n$ has the meaning given above and (B) of an aliphatic or aromatic aldehyde of the general formula

R—CHO in which R has the meaning given above, in a molar ratio of at least 1:1, with an excess of oxygen or an oxygen-containing gas at a temperature of about 0 to 100° C., optionally under pressure and in the presence or absence of an inert solvent, the starting mixture being admixed with a soluble iron compound which serves as a catalyst and is added in a proportion sufficient to obtain an iron concentration of about 0.3 to 3 parts by weight per 1 million parts by weight of starting mixture, completing the reaction and thereafter distilling off resulting ω-hydroxycarboxylic acid lactone and resulting carboxylic acid.

Suitable starting products include, for example: cyclobutanone, cyclopentanone, cyclohexanone, cycloheptanone and cyclooctanone or cyclododecanone as the ketone component and include formaldehyde, acetaldehyde, propionaldehyde, benzaldehyde or tolualdehyde as the aldehyde component.

It is especially advantageous to use the ketone in a slight molar excess proportion with respect to the aldehyde, preferably in a molar proportion of 1.1:1 to 3:1. Basically, however, it is merely possible to oxidize a proportion of ketone equivalent to the proportion of aldehyde present. It would therefore be uneconomic to use a molar ratio greater than 3:1 although this would principally be possible.

The temperatures at which the reaction can be carried out should conveniently be limited to a range of about 30 to 60° C., as the reaction proceeds too reluctantly at lower temperatures, while higher temperatures promote the formation of polymers and undesirable carboxylic acids. The oxidizing reaction can be realized with pure oxygen or an oxygen-containing gas, e.g. air, at atmospheric pressure or under elevated pressure of up to about 10 atmospheres (gauge pressure). All that must be done is to ensure good distribution of the oxygen in the reaction liquid by means of a suitable mechanical device in the reaction vessel.

As the ketone to be oxidized is a relatively costly material, it is advantageous to use the ketone in a proportion not greater than that which corresponds to the absoluely necessary minimum excess with respect to the aldehyde, and to dilute the starting mixture by means of an inert organic solvent, such as ethyl acetate or acetone. When used in an appropriate excess, the ketone itself may serve as a solvent for the other components.

An essential feature of the present invention comprises using a catalyst for accelerating the oxidizing reaction. Iron compounds soluble in the reaction mixture, such as ferric chloride, ferric acetate or iron acetonyl acetate, have proved especially suitable for this. The catalytic effect obtainable with these compounds is especially favorable for a concentration of about 1 to 3 parts by weight iron per 1 million parts by weight starting mixture.

The reaction of the process of the present invention takes place more especially in two phases. In the first phase, the catalyst incurs the accelerated formation of a peroxidic compound which produces the lactone in the second phase. The end of the first phase is reached when the starting mixture ceases to absorb oxygen, and the end of the second phase is reached when the reaction mixture no longer includes the peroxidic compound. The presence of any peroxidic compound in the reaction mixture can be detected by adding a potassium iodide solution which results in iodine being separated. The observation that the first reaction phase proceeds more rapidly than the second phase permits carrying out the present process in two separate stages. The first process stage comprising peroxide formation is complete when oxygen ceases to be absorbed, whereupon the reaction mixture obtained is conveyed from a first reaction vessel to a second reaction vessel to undergo post-reaction therein. In order to avoid undesirable side-reactions, it is advantageous to stabilize the reaction mixture in the second processing stage by admixture of an agent, such as an ammonium pyrophosphate or a polyphosphate, known to be a stabilizer for percarboxylic acid solutions. Needless to say that the process of the present invention is in no way limited to the two-stage variant, which should more especially be used for continuous operation. For discontinuous operation, the reaction can be carried out in a single reaction vessel. In this latter case, the reaction mixture is allowed, once oxygen ceases to be absorbed, to stand for some time in the same reaction vessel to undergo post-reaction therein.

The process of the present invention advances the art and is superior to conventional methods for making ω-hydroxycarboxylic acid lactones in view of the fact that no dangerous percarboxylic acids must be used and that the lactone is obtained through the use of an especially efficient catalyst in increased yields not accessible heretofore.

EXAMPLE 1

210 grams cyclobutanone (3 mols) and 106 grams benzaldehyde (1 mol) were reacted with oxygen in a heatable shaking means at a temperature of 30° C. and under a pressure of 2 atmospheres (gauge pressure) in the presence of $FeCl_3$ as a catalyst. The reaction mixture contained 2 parts by weight iron per 1 million parts by weight. After 8 hours, oxygen ceased to be absorbed. After a further 12 hours, the reaction mixture could not be found when treated with a potassium iodide solution to still include peroxidic oxygen, and the reaction was complete. Distilling the reaction mixture under a pressure of 10 mm. mercury resulted in 189 grams cyclobutanone, 18.5 grams γ-butyrolactone boiling at a temperature of 78–83° C., and 122 grams benzoic acid. For a 20% cyclobutanone conversion rate, the yield of γ-butyrolactone was 72%, related to the quantity of ketone transformed. For further identifying the γ-butyrolactone, the hydrazide was prepared which melted at 89° C.

EXAMPLE 2

168 grams cyclopentanone and 58 grams propionaldehyde were reacted with oxygen in a stainless steel autoclave at a temperature of 25° C. and under a pressure of 10 atmospheres (gauge pressure) in the presence of $FeCl_3$. The reaction mixture contained 2 parts by weight iron per 1 million parts by weight. Good gas distribution in the reaction mixture was ensured by means of a vibration mixer. After 4 hours, oxygen ceased to be absorbed and after a further 5 hours all the peroxidic oxygen had been consumed for lactone formation. The reaction mixture was then distilled under reduced pressure at a temperature below 40° C. in the still portion of the distilling means. 126 grams cyclopentanone, 74 grams propionic acid, 4 grams of a polyester of 5-hydroxy valeric acid and 45 grams of a fraction boiling at 144 to 146° C. under a pressure of 40 mm. mercury were obtained. Reacting the fraction with hydrazine hydrate resulted in a hydrazide which melted at 105° C. and was identical with the 5-hydroxy valeric acid hydrazide. The fraction boiling at 144–146° C. under a pressure of 40 mm. mercury could thus be identified as δ-valerolactone. The yield of monomeric δ-valerolactone and polymeric by-product was 98%, the yield of monomer alone 90%, related to the cyclopentanone conversion rate of 22.5%.

EXAMPLE 3

A stainless steel flow reactor in upright position and having a capacity of 5 liters was charged per hour with 9 kg. of a solution of 15% acetaldehyde in cyclohexanone and oxygen was introduced concurrently therewith through a gas distributing plate in a proportion such as absorbed by the reaction solution, a pressure of 4.5 atmospheres (gauge pressure) being maintained. The temperature prevailing in the reactor was maintained at 47° C. by cooling. The reaction solution was continuously removed from the reactor as its upper end and introduced into a container having a capacity of 100 liters to undergo post-reaction therein. The reaction solution leaving the post-reactor was free from peroxides and was continuously distilled. 1.84 kg. acetic acid, 6 18 kg. cyclohexanone, 1.54 kg. monomeric ε-caprolactone and 0.17 kg. distillation sump were obtained per hour. Monomeric lactone was obtained in a yield of 90%, related to the cyclohexanone conversion rate. There were also obtained 8% polymeric lactone in the sump phase of the distilling means.

EXAMPLE 4

An aluminum flow reactor in upright position having a capacity of 5 liters was charged per hour with 10 kg. of a solution which consisted of 18% by weight acetaldehyde, 41% by weight cyclohexanone and 41% by weight ethyl acetate and which also contained iron acetonyl acetate as a catalyst. The solution contained 3 parts by weight iron per 1 million parts by weight. Oxygen was forced concurrently therewith to flow in the reactor through a gas distributing plate at a rate sufficient to produce a pressure of 4 atmospheres (gauge pressure). The temperature prevailing in the reactor was maintained at 48° C. by cooling. The reaction mixture and the gas were introduced into the lower portion of the reactor, and reaction product was continously removed at the upper end of the reactor to be conveyed to a post-reactor having a capacity of 100 liters, which was cooled so as to maintain a temperature of 30° C. At the same time, the reaction mixture was stabilized with 0.02% by weight of a mixture of quinoline and sodium tripolyphosphate in the quantitative ratio of 1:1. 11.2 kg. of product were removed per hour from the post-reactor. After distillative treatment, the product was found to be composed of:

4.1 kg. ethyl acetate,
2.45 kg. acetic acid,
1.32 kg. unreacted cyclohexanone,
3.20 kg. monomeric ε-caprolactone, and
0.14 kg. polymers.

Monomeric lactone was thus obtained in a yield of 96%, related to the cyclohexanone which underwent conversion.

EXAMPLE 5

A solution of 80 grams acetaldehyde and 252 grams cyclo-octanone in 252 grams acetone was admixed with ferric chloride and placed into a pressure vessel having a capacity of 2 liters and provided with a turbomixer and a cooling coil. The solution contained 2 parts by weight iron per 1 million parts by weight. Oxygen was then introduced into the vessel until a pressure of 6 atmospheres (gauge pressure) had been obtained which was maintained during the reaction by the addition of further oxygen. The temperature prevailing in the reactor was adjusted to 30° C. After 45 hours, the solution was distilled and 116 grams cyclooctanone were recovered. There were also obtained 108 grams acetic acid and 154 grams monomeric and polymeric ω-hydroxycaprylic acid lactone. Monomeric lactone was obtained in a yield of 62%, related to the amount of cyclooctanone transformed.

EXAMPLE 6

A solution of 91 grams cyclododecanone and 20 grams acetaldehyde in 100 grams acetone was admixed with a proportion of ferric acetate sufficient to obtain an iron content of 2 parts by weight per 1 million parts by weight in the solution. The solution was then introduced in a shaking vessel provided with a double-wall jacket. Air above the liquid was expelled by means of oxygen and oxygen was then forced into the vessel under a pressure of 2 atmospheres (gauge pressure). The temperature prevailing in the vessel was adjusted concurrently therewith to a value of 30° C. by means of a thermostat, and the vessel was intensely shaken accompanied by oxygen absorption. This procedure was discontinued after 4 hours and the solution was abandoned for a further 48 hours at a temperature of 30° C., and subsequently distilled. 41 grams or 45% by weight of the quantity of cyclododecanone used were recovered. 12-dodecalactone was obtained in a yield of 38 grams. There were also obtained 12-dodecadicarboxylic acid and polymeric lactone as by-products.

We claim:
1. A process for the simultaneous manufacture of aliphatic hydroxycarboxylic acid lactones of the general formula:

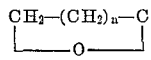

in which $n$ stands for a number of 2 to 12, and of carboxylic acids of the general formula:

R—COOH in which R stands for a member selected from the group consisting of hydrogen, an alkyl group having at most two carbon atoms, a phenyl group and a methyl-substituted phenyl group, which comprises reacting a mixture consisting of (A) a cycloaliphatic ketone of the general formula:

in which $n$ has the meaning given above and (B) of an aldehyde of the general formula:

R—CHO in which R has the meaning given above, in a molar ratio of at least 1:1 with an excess of oxygen at a temperature of about 0 to 100° C., the starting mixture being admixed with a soluble iron compound which serves as a catalyst and is added in a proportion sufficient to obtain an iron concentration of about 0.3 to 3 parts by weight per 1 million parts by weight starting mixture, completing the reaction and thereafter distilling off resulting hydroxycarboxylic acid lactone and resulting carboxylic acid.

2. A process as claimed in claim 1, wherein in the general formulae $n$ stands for a number of 2 to 10.

3. A process as claimed in claim 1, wherein the oxygen is used in the form of an oxygen-containing gas.

4. A process as claimed in claim 1, wherein the cycloaliphatic ketone is at least one member selected from the group consisting of cyclobutanone, cyclopentanone, cyclohexanone, cycloheptanone, cyclooctanone and cyclododecanone.

5. A process as claimed in claim 1, wherein the aldehyde component is at least one member selected from the group consisting of formaldehyde, acetaldehyde, propionaldehyde, benzaldehyde and telualdehyde.

6. A process as claimed in claim 1, wherein the ketone is used in a slight molar excess proportion with respect to the aldehyde.

7. A process as claimed in claim 6, wherein the ketone and the aldehyde are used in a molar ratio of 1.1:1 to 3:1.

8. A process as claimed in claim 1, wherein the reaction is carried out under a pressure within the range of atmospheric pressure up to about 10 atmospheres (gauge pressure).

9. A process as claimed in claim 1, wherein the reaction is carried out at a temperature of between about 30 and 60° C. under a pressure within the range of atmospheric pressure up to about 10 atmospheres (gauge pressure).

10. A process as claimed in claim 1, wherein the reaction is carried out in the absence of a solvent.

11. A process as claimed in claim 1, wherein the reaction is carried out in the presence of an inert solvent.

12. A process as claimed in claim 11, wherein the inert solvent is at least one member selected from the group consisting of ethyl acetate, acetone and the ketone used.

13. A process as claimed in claim 1, wherein the catalyst is at least one member selected from the group consisting of ferric chloride, ferric acetate and iron acetonyl acetate.

14. A process as claimed in claim 13, wherein the starting mixture contains iron in a concentration of about 1 to 3 parts by weight per 1 million parts by weight.

15. In process for preparing ε-caprolactone by catalytic oxidation of cyclohexanone in the liquid phase with a gas containing molecular oxygen and in the presence of a catalyst and an aldehyde, the improvement which consists in employing benzaldehyde as said aldehyde, and an iron salt dissolved in the reaction mixture as said catalyst.

References Cited

UNITED STATES PATENTS 3,317,563   5/1967   Horlenko et al. _____ 260—343

HENRY R. JILES, Primary Examiner

C. M. SHURKO, Assistant Examiner

U.S. Cl. X.R.

252—441, 472; 260—343.5, 343.6, 413, 484, 485, 523, 561